Dec. 22, 1925.

C. S. BARRELL

TIRE

Original Filed March 14, 1921

INVENTOR
Charles S. Barrell
BY Robt. D. Harris
ATTORNEY

Patented Dec. 22, 1925.

1,566,266

UNITED STATES PATENT OFFICE.

CHARLES S. BARRELL, OF BOSTON, MASSACHUSETTS.

TIRE.

Application filed March 14, 1921, Serial No. 452,203. Renewed May 21, 1925.

*To all whom it may concern:*

Be it known that I, CHARLES S. BARRELL, a citizen of the United States, residing at Boston, in the county of Suffolk and State of Massachusetts, have invented an Improvement in Tires, of which the following description, in connection with the accompanying drawings, is a specification, like characters on the drawings representing like parts.

The invention to be hereinafter described relates to pneumatic tires and is an improvement upon the tire disclosed in Letters Patent No. 1,086,924, granted to John E. Lee, February 10, 1914.

The tire of said patent comprises a reinforcement formed of layers of metal disks having a staggered relation such that the spaces between the disks of one layer are covered by disks of other layers, the construction being such that a continuous imperforate armor is provided for the tread of the tire.

The disks are embedded in rubber layers which are separated by canvas layers, the purpose being to prevent one disk layer from rubbing against an adjacent disk layer, and thereby prevent movement of the disks in respect to the rubber such as would granulate or crumble the rubber and allow displacement of the disks so that areas of the tread would be exposed and puncturable.

This is a good efficient form of construction, but there are certain objections thereto. The presence of canvas layers between the rubber layers containing the disks reduces the resiliency and flexibility of the tire and it is difficult to obtain efficient bond between the canvas layers and the rubber layers containing the disks. As a consequence the canvas layers are liable to rub against the rubber layers and cause the latter to granulate or crumble and release the disks to such an extent that they may be susceptible of displacement with a resultant exposure of portions of the tire and liability of puncture.

The aim and purpose of the present invention, therefore, is to provide a tire construction in which the resiliency and elasticity are increased and the disks are securely maintained in proper relation to afford an uninterrupted continuous armor for the tread portion of the tire without liability of puncture.

Figure 1:
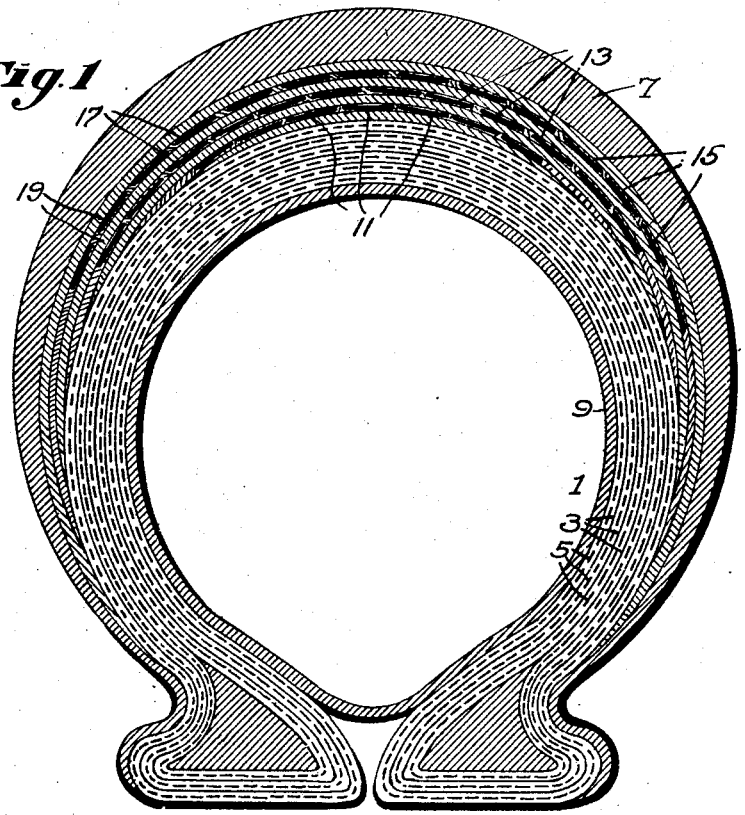
Figure 2:
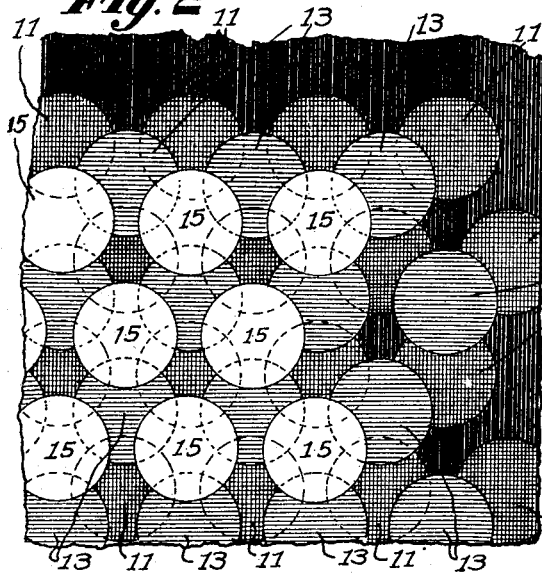
Figure 3:
Figure 4:
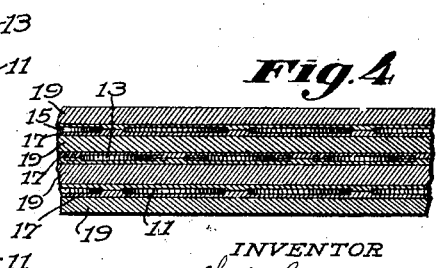

The character of the invention will be best understood by reference to the following description of one good form thereof shown in the accompanying drawings, wherein:

Fig. 1 is a transverse section through a pneumatic tire embodying the invention;

Fig. 2 on an enlarged scale is a plan showing the staggered relation of the disks;

Fig. 3 is a section through a portion of the disk containing layers of the tire before being compressed into a unitary whole; and Fig. 4 is a view similar to Fig. 3 showing the construction after the layers have been compressed together.

Referring to the drawings, the tire shown therein as one form of the invention may comprise a carcass 1 composed of rubber layers 3 containing canvas or fabric layers 5. The outer rubber layer may be thickened to provide the usual rubber tread 7. Within the carcass is the usual inner tube 9.

The armor embodying the invention may be located at any appropriate point within the tire to afford the necessary protection to the tread. In the present instance of the invention the armor is shown located between the carcass and the tread 7.

This armor, in the present instance of the invention, comprises a layer of disks or elements 11 of steel or other suitable material preferably disposed in spaced relation. A layer of similar disks 13 is provided, the location of the disks being such that they cover certain of the spaces between the disks 11 of the first layer. A still further layer of disks 15 may be provided so located as to cover the spaces between the disks 11 which are not covered by the disks 13. The disposition of the disks of the several layers is such that a continuous armor is provided with no spaces between the armor exposed to puncture.

The disks of said layers may be embedded or incorporated in rubber layers 17 which may be treated with zinc, lead, or other appropriate vitalizing agent to give the rubber layer the toughness and resistance required. In preparing the rubber it may be ground or pulverized and mixed with the zinc, lead or other vitalizing agent and then may be passed through suitable rollers to press the same into layer form.

It is desirable that the rubber layers 17 containing the disks shall be separated a substantial distance apart to prevent the disks of adjacent layers from coming into contact with each other. To accomplish this, in the present instance of the invention, rubber layers 19 may be provided between the rubber layers 17 containing the disks and preferably the layers 19 are thicker than the layers 17. These thicker layers may be treated with zinc or lead or other vitalizing agent and preferably in a greater percent than employed in treating the disk containing layers 17. As a consequence, the layers 19 will be tougher and more resistant than the disk containing layers 17 and the latter, being less vitalized than the layers 19, will be more resilient.

Preferably the disks are coated with copper electrically to enable the rubber more securely to adhere thereto.

The armor thus formed may be securely united with the carcass and tread by vulcanization so that the structure described is, in effect, an integral whole.

The disks or elements when mounted in rubber layers and separated by rubber layers vitalized as described, will be securely held in proper relation so as to insure that the disks of the layers will always be maintained in position to prevent displacement of the disks and exposure of areas susceptible to puncture. Also, the construction is such that the rubber containing the disks will not be so rubbed as to granulate or crumble the rubber. As a consequence the disks are so bound that they cannot shift or shuffle and be displaced so as to allow exposed unarmored portions of the tread of the tire. At the same time the armor will have a desirable resilient character materially improving the quality, usefulness and service of the tire.

It will be understood that the disks or elements do not need to be located in the exact relation shown in the drawing, but that they may be variously positioned provided that they afford continuous armor for the tread of the tire. While three disk containing layers are disclosed herein, it will be apparent that the number of the layers employed may be varied.

It will be understood that the invention is not limited to the specific embodiment shown and that various deviations may be made therefrom without departing from the spirit and scope of the appended claims.

What is claimed is:

1. A tire comprising layers of vitalized rubber, layers of puncture resisting elements incorporated in said rubber layers, the elements of the puncture resisting layers having spaces between them, and the elements of one layer being disposed to cover the spaces between the elements of the other layer; and a layer of rubber interposed between the layers containing the puncture resisting elements and vitalized to a greater degree than the layers containing the puncture resisting elements, thereby giving the intermediate layer greater toughness and less resilience than the layers containing the puncture resisting elements.

2. A tire comprising a layer of vitalized rubber, a layer of metallic puncture resisting elements having spaces between them and incorporated in said rubber layer, a second layer of vitalized rubber, a layer of metallic puncture resisting elements having spaces between them and incorporated in the second rubber layer, the elements of the second layer being opposed to and covering the spaces between the elements of the first layer; and a layer of rubber interposed between and vitalized to a greater degree than said first and second rubber layers.

3. A tire comprising a layer of vitalized rubber, a layer of metallic puncture resisting elements having spaces between them and incorporated in said rubber layer, a second layer of vitalized rubber, a layer of metallic puncture resisting elements having spaces between them and incorporated in said second layer, a third layer of vitalized rubber, a layer of metallic puncture resisting elements having spaces between them and incorporated in said third rubber layer, and rubber layers intermediate said rubber layers and vitalized to a greater degree, thereby to give the same greater toughness and less resilience than the first, second and third layers.

4. A tire comprising layers of vitalized rubber, each of said layers containing a layer of metallic disks having spaces between them, the disks of the respective layers being disposed to overlap and cover the spaces between the disks so as to provide a continuous imperforate armor for the tire tread, and layers of rubber interposed between the layers containing the puncture resisting disks and vitalized to a greater degree than the latter layers, thereby giving the interposed layers greater toughness and less resilience than the layers containing the disks.

5. A tire comprising layers of vitalized rubber, each of said layers containing a layer of metallic disks having spaces between them, the disks of the respective layers being disposed to overlap and cover the spaces between the disks so as to provide a continuous imperforate armor for the tire tread, and layers of rubber interposed between the layers containing the puncture resisting disks and vitalized to a greater degree than the latter layers, all of said layers being vulcanized to form in effect an integral whole.

6. A tire comprising an inner portion including alternate fabric and rubber layers, a rubber tread and a puncture resisting armor interposed between said inner portion and tread comprising a plurality of layers of vitalized rubber, each containing layers of metallic puncture resisting elements having spaces between them, the elements of the respective layers being disposed to overlap and cover the spaces between the elements, thereby to provide continuous puncture resisting means, and layers of rubber interposed between the layers containing the puncture resisting elements and vitalized to a greater degree than the latter, said inner portion, rubber tread and armor being vulcanized to form in effect an integral whole.

7. A tire comprising layers of vitalized rubber, each having layers of puncture resisting elements therein, and layers of rubber outside of and between the layers containing the puncture resisting elements and vitalized to a greater degree than the latter layers.

In testimony whereof, I have signed my name to this specification.

CHARLES S. BARRELL.